US012624536B1

(12) United States Patent
Stravinsky, II et al.

(10) Patent No.: US 12,624,536 B1
(45) Date of Patent: May 12, 2026

(54) DUAL-MODE FLUSH SYSTEMS AND METHODS THEREOF

(71) Applicants: Eugene G. Stravinsky, II, Wrightstown, NJ (US); Albert Mattiucci, Dunedin, FL (US)

(72) Inventors: Eugene G. Stravinsky, II, Wrightstown, NJ (US); Albert Mattiucci, Dunedin, FL (US)

( * ) Notice: Subject to any disclaimer, the term of this patent is extended or adjusted under 35 U.S.C. 154(b) by 0 days.

(21) Appl. No.: 18/960,614

(22) Filed: Nov. 26, 2024

(51) Int. Cl.
*E03D 5/10* (2006.01)
*B60R 15/04* (2006.01)

(52) U.S. Cl.
CPC .............. *E03D 5/105* (2013.01); *B60R 15/04* (2013.01)

(58) Field of Classification Search
CPC ......... B60R 15/04; E03D 11/11; E03D 11/13; E03D 11/17; E03D 11/18; E03F 1/008
See application file for complete search history.

(56) References Cited

U.S. PATENT DOCUMENTS

| | | | | |
|---|---|---|---|---|
| 4,550,452 | A | * | 11/1985 | Tufts ........................ E03D 11/11 |
| | | | | 4/319 |
| 4,892,349 | A | | 1/1990 | Sargent |

| | | | | |
|---|---|---|---|---|
| 6,006,766 | A | | 12/1999 | Soulages |
| 6,352,088 | B1 | | 3/2002 | Stegall |
| 7,032,255 | B2 | | 4/2006 | Lutz |
| 2006/0059611 | A1 | | 3/2006 | Trickel |
| 2021/0078507 | A1 | | 3/2021 | Van Beek et al. |
| 2021/0380051 | A1 | * | 12/2021 | Taylor ..................... E03F 1/008 |
| 2022/0153211 | A1 | | 5/2022 | Maktin |
| 2022/0381010 | A1 | * | 12/2022 | Hooper ................... B60R 15/04 |
| 2023/0349138 | A1 | * | 11/2023 | Townes ................... E03F 1/006 |

* cited by examiner

*Primary Examiner* — Janie M Loeppke
(74) *Attorney, Agent, or Firm* — John Rizvi; John Rizvi, P.A.—The Patent Professor®

(57) ABSTRACT

The present disclosure relates to systems and methods for waste management in recreational vehicles. A toilet bowl assembly of the system receives waste. A flushing mechanism of the system is operatively connected to the toilet bowl assembly. A plurality of user activation interfaces is coupled to the flushing mechanism, configured to activate a mode of operation of the system. The mode of operation includes a black tank mode and a residential mode such that based on an unavailability of an external sewer connection, the system operates in the black tank mode directing the waste to an integrated black tank and based on an availability of the external sewer connection, the system operates in the residential mode directing the waste directly to the external sewer connection, bypassing the integrated black tank.

18 Claims, 4 Drawing Sheets

500

302 304

100

200

300

112

108

400

202

500

302 304

600

DUAL-MODE FLUSH SYSTEMS AND METHODS THEREOF

CROSS REFERENCE TO RELATED APPLICATIONS

The present application is related to co-pending commonly owned patent application Ser. No. 18/605,043 filed on Mar. 14, 2024, which is incorporated herein by reference in their entirety.

FIELD OF THE INVENTION

The present invention relates generally to flush systems, and more particularly, to methods and systems for bypassing black tank and/or sewage, as and when required.

BACKGROUND OF THE INVENTION

Recreational vehicles, which includes a variety of campers, are widely used, and provide short-term or long-term living quarters. In this regard, a conventional recreational vehicle (RV) typically includes a toilet. Larger RVs typically include multiple toilets, and can produce several gallons of wastewater per day, which is typically stored on board and disposed of at regular intervals.

Traditional RV toilet systems utilize a single waste disposal method, where waste is deposited into a black tank. These systems require manual intervention to switch between discharging waste into the black tank or directly into an external sewer line when such a connection is available. This manual process can be cumbersome and inconvenient, especially in varying travel scenarios where the availability of external sewer connections can change frequently.

Further, conventional systems often do not offer flexibility in the method of user interaction, generally relying on single, manual flush mechanisms that do not adjust for different use cases or environmental conditions. Additionally, these systems are inefficient in terms of water usage and energy consumption, lacking advanced features that adapt operation based on the presence or absence of external infrastructure.

Accordingly, there is a need for a solution to at least one of the aforementioned problems. For instance, there is an established need for a flush system for RVs or the like having toilets therein, which is more desirable, convenient, and efficient to use in terms of disposing off waste.

SUMMARY OF THE INVENTION

The present disclosure relates to bypass systems in recreational vehicles that enable users to dispose off waste to a black tank or directly to a sewer exit point as and when required.

In an aspect, the present disclosure relates to a flush system in a recreational vehicle, including a toilet bowl assembly to receive waste, a flushing mechanism operatively connected to the toilet bowl assembly, and a plurality of user activation interfaces coupled to the flushing mechanism, configured to activate a mode of operation of the flush system, wherein the mode of operation includes one of: a black tank mode and a residential mode.

In an aspect, in the black tank mode, the flushing mechanism may be configured to direct the waste to an integrated black tank of the recreational vehicle when an external sewer connection is unavailable.

In an aspect, in the residential mode, the flushing mechanism may be configured to direct the waste directly to the external sewer connection, bypassing the integrated black tank.

In an aspect, the plurality of user activation interfaces may include a foot pedal to activate the black tank mode, and at least one of: a push button or a foot sensor to activate the residential mode.

In an aspect, the flushing mechanism may include a control module configured to automatically select the mode of operation based on availability of an external sewer connection, wherein the flush system may include one or more sensors to detect the availability of the external sewer connection.

In an aspect, the flush system may include a power supply unit configured to provide electrical power to the flush system.

In an aspect, the flushing mechanism may include a bypass valve, wherein in the black tank mode, a user input received via one of the plurality of user activation interfaces may trigger the bypass valve to open to allow the waste to flow into a black tank, and wherein in the residential mode, the user input received via another one of the plurality of user activation interfaces may trigger the bypass valve to close to allow the waste to flow into an external sewer connection.

In an aspect, the flushing mechanism may include a first floor flange and a second floor flange for use in the black tank mode and the residential mode, respectively.

In an aspect, the flushing mechanism may include a first floor flange and a discharge unit to direct the waste based on the mode of operation.

In an aspect, the discharge unit may include a rotating elbow fitting configured to direct the waste directly to an external sewer connection, bypassing the black tank in the residential mode.

In another aspect, the present disclosure relates to a method of managing waste in a recreational vehicle, including receiving a user input via a plurality of user activation interfaces of a flush system, determining a mode of operation of the flush system based on the received user input, wherein the mode of operation includes one of: a black tank mode, or a residential mode, activating a flushing mechanism corresponding to the determined mode of operation, and operating the flush system to transport waste from a toilet bowl assembly through the activated flushing mechanism.

In an aspect, in the black tank mode, the method may include directing the waste, through the flushing mechanism, to an integrated black tank of the recreational vehicle.

In an aspect, in the residential mode, the method may include directing the waste, through the flushing mechanism, to an external sewer connection, bypassing the integrated black tank.

In an aspect, the plurality of user activation interfaces may include a foot pedal, and at least one of a push button or a foot sensor.

In an aspect, when receiving the user input via the foot pedal, the method may include determining the mode of operation as the black tank mode and directing the waste to an integrated black tank of the recreational vehicle through the flushing mechanism.

In an aspect, when receiving the user input via at least one of the push button or the foot sensor, the method may include determining the mode of operation as the residential mode and directing the waste to an external sewer connection through the flushing mechanism.

In an aspect, determining the mode of operation may include detecting, via one or more sensors, an availability of an external sewer connection, determining the mode of operation as the black tank mode when the external sewer connection is unavailable, and determining the mode of operation as the residential mode when the external sewer connection is available.

In an aspect, the flushing mechanism may include a bypass valve, wherein in the black tank mode, the method may include triggering the bypass valve to open, when receiving the user input via one of the plurality of user activation interfaces, to allow the waste to flow into a black tank, and wherein in the residential mode, the method may include triggering the bypass valve to close, when receiving the user input via another one of the plurality of user activation interfaces, to allow the waste to flow into an external sewer connection.

In an aspect, the flushing mechanism may include a first floor flange and a second floor flange, wherein activating the flushing mechanism may include activating the first floor flange in the black tank mode and the second floor flange in the residential mode.

In an aspect, flushing mechanism may include a first floor flange and a discharge unit to transport the waste based on the mode of operation.

These and other objects, features, and advantages of the present disclosure will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
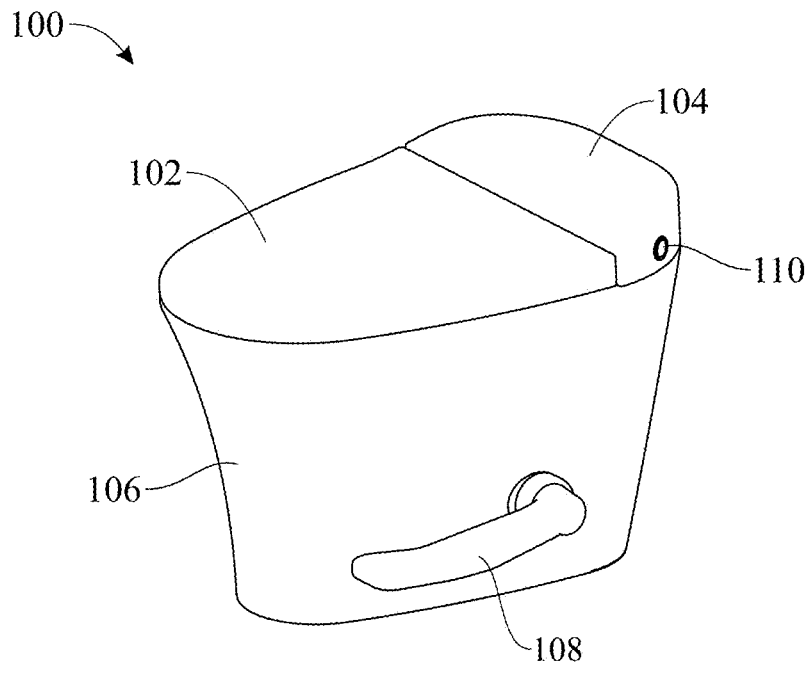
FIG. 1 shows an example representation of a flush system, in accordance with embodiments of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Unless the context requires otherwise, throughout the specification and claims which follow, the word "comprise" and variations thereof, such as, "comprises" and "comprising" are to be construed in an open, inclusive sense that is as "including, but not limited to."

The various embodiments throughout the disclosure will be explained in more detail with reference to FIGS. 1-8. In particular, shown throughout the figures, the present disclosure is directed towards an advanced waste management system for recreational vehicles (RVs), incorporating a dual-mode flushing mechanism that offers significant improvements over traditional RV toilets. This system allows for switching between two flushing modes: a black tank mode, where waste is directed into an onboard storage tank, and a residential mode that bypasses the black tank and discharges the waste directly into an external sewer connection. The system features user-friendly activation interfaces including, but not limited to, a foot pedal, push button, and foot sensor, catering to different user preferences and situations. Designed to operate on a 12-volt power supply, the system is automatic overflow prevention and emergency manual override, making it an ideal solution for modern RV travelers seeking convenience, efficiency, and adaptability in waste management. energy-efficient and includes safety features.

In accordance with embodiments of the present disclosure, there is described a flush system and a method for waste management in a recreational vehicle. A user input is received via a plurality of user activation interfaces of the flush system. A mode of operation of the flush system is determined based on the user input, where the mode of operation may include a black tank mode or a residential mode. A flushing mechanism corresponding to the determined mode of operation is activated. The flush system is operated to transport the waste from a toilet bowl assembly through the activated flushing mechanism. These and other advantages of the disclosed system will be explained in detail throughout the present disclosure.

FIG. 1 shows an example representation of a flush system 100, in accordance with embodiments of the present disclosure.

Referring to FIG. 1, the example representation shows the flush system 100 including integrated components tailored for dual flushing modes in a recreational vehicle. In some embodiments, the flush system 100 may include a dual-mode flush system 100 and/or a bypassing system 100. The dual-mode flush system 100 may include a single exit point for discharging waste. The bypassing system 100 may include multiple exit points for discharging the waste. The dual-mode flush system 100 is explained in detail with reference to FIGS. 2 and 4, and the bypassing system 100 is explained in detail with reference to FIGS. 5-8.

As shown in FIG. 1, the flush system 100 (e.g., both the dual-mode flush system and the bypassing system) includes a seat and lid assembly 102. The seat and lid assembly 102 may include the toilet seat and the lid, designed for user comfort and hygiene. The lid may be closed to cover the bowl when not in use, helping to maintain cleanliness.

The flush system 100 includes a rear cover 104. The rear cover 104 is a protective cover located at the back of the toilet, likely concealing mechanical components such as a flushing mechanism (not shown in FIG. 1) and connections to the electrical and plumbing systems. The rear cover 104 may enhance the aesthetic appeal of the flush system 100 by hiding functional but visually unappealing parts.

Further, the flush system 100 includes a toilet bowl assembly 106, interchangeably referred to as a bowl base 106. The toilet bowl assembly 106 is the foundational part of the toilet where waste is collected before flushing. The toilet bowl assembly 106 is designed to receive waste and efficiently direct the waste towards a suitable discharge outlet through the flushing mechanism. The flushing mechanism is operatively connected to the toilet bowl assembly 106 to direct the waste to the suitable discharge outlet.

In some embodiments, the flush system 100 includes a plurality of user activation interfaces coupled to the flushing mechanism. The plurality of user activation interfaces may be configured to activate the flushing mechanism based on a mode of operation of the flush system 100. In some embodiments, the flushing mechanism may include a control module to automatically select the mode of operation based on availability of an external sewer connection such that the flush system 100 may include one or more sensors to detect the availability of the external sewer connection.

In some embodiments, the mode of operation may include one of a black tank mode, or a residential mode. It may be appreciated that the black tank mode may be interchangeably referred to a non-bypass mode and the residential mode may be interchangeably referred to a bypass mode in the present disclosure.

The plurality of user activation interfaces may include a foot pedal 108 and a push button 110. In some embodiments, the flush system 100 may receive a user input via the plurality of user activation interfaces to determine the mode of operation of the flush system 100.

When the user input is received via the foot pedal 108, the black tank mode is actuated such that the flushing mechanism is configured to direct the waste to an integrated black tank (not shown in FIG. 1) of the recreational vehicle. A person of ordinary skill in the art will understand that black tank may store waste, e.g., black water which is the water and waste from the toilet bowl assembly 106. In some embodiments, physical pressure by a user on the foot pedal 108 triggers the black tank flush mode. The black tank mode is for use when an external sewer connection is not available. In some embodiments, the black tank may be equipped with smart level monitoring via one or more sensors to monitor the fill level of the black tank and alert the user via digital displays or mobile applications when the black tank approaches capacity. This may help in preventing overfilling, thereby enhancing convenience. In some embodiments, the black tank may be equipped with ultrasonic sensors or capacitance sensors for accurate fill level measurement.

When the user input is received via the push button 110, the residential flush mode is actuated such that the flushing mechanism is configured to direct the waste to the external sewer connection, bypassing the integrated black tank. In some embodiments, physical pressure by the user on the push button 110 triggers the residential flush mode. The residential mode is for use when the external sewer connection is available. In some embodiments, a backup mechanism may be implemented by the flush system 100 that automatically switches to the black tank mode if the external sewer connection or line is blocked or overflows, preventing backflow into the recreational vehicle.

It may be appreciated that the push button 110 may be configured as a button, a lever, or any like mechanism within the scope of the present disclosure. Further, it may be appreciated that although the push button 110 is depicted at a side of the rear cover 204, it may be configured at any position on the flush system 100.

In some embodiments, the plurality of user activation interfaces, e.g., the foot pedal 108 and/or the push button 110 may be configured as gesture-control interfaces. The gesture-control interfaces may include sensors that detect gestures of the user to control the mode of operation of the flush system 100 without physical contact. For example, the gesture-control interfaces may implement infrared sensors or motion sensors installed near the toilet that may respond to specific movements by the user. In some other embodiments, the plurality of user activation interfaces may be equipped with adjustable sensitivity controls to allow the user to customize the sensitivity of touch, adapting the flush system 100 to individual preferences or environmental conditions. The settings may be adjusted via a physical dial on the toilet or through a digital interface on a mobile application of the user or onboard control panel, but not limited to the like.

In some embodiments, the plurality of user activation interfaces may be activated via voice commands. The user activation interfaces may integrate with smart home devices or systems within the recreational vehicle such as by using virtual assistants or software agents such as but not limited to Alexa™, Google™, Siri™, or the like, to allow voice-activated controls for flushing, opening, and closing the seat and lid assembly 102, and other toilet settings. In some other embodiments, a remote control panel may be associated with the plurality of user activation interfaces. For example, a wall-mounted or handheld remote control panel may be associated with the user activation interfaces that may operate all toilet functions including flushing, opening, or closing the seat and lid assembly 102, etc.

It may be appreciated that the plurality of user activation interfaces may be activated using either physical controls (like foot pedal 108 or push button 110) or digital controls (like touchscreens or applications), depending on user preference or specific requirements, thereby allowing users to customize controls based on their ergonomic and technological preferences.

It may be appreciated that the flush system 100 may be configured for any recreational vehicle within the scope of the present disclosure.

Figure 2:
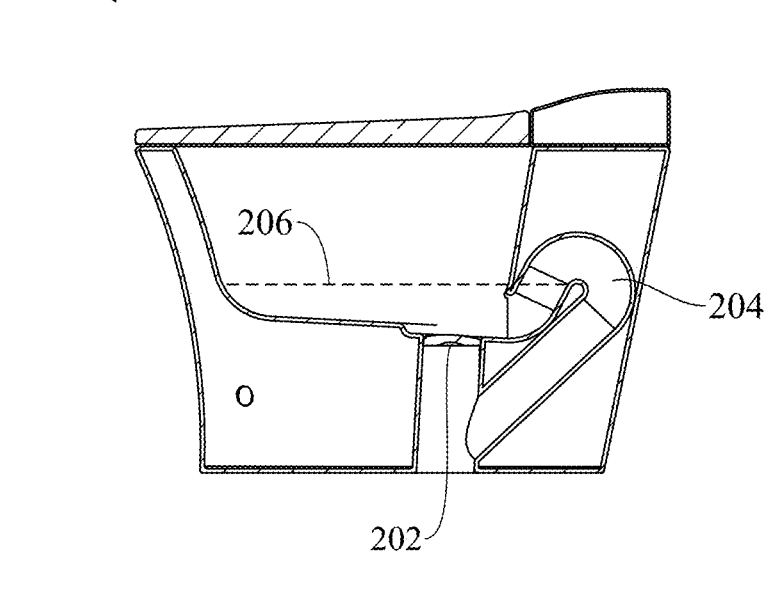
FIG. 2 shows an example representation of a cross-sectional view of a dual-mode flush system, in accordance with first embodiments of the present disclosure.

FIG. 2 shows an example representation 200 of a cross-sectional view of the dual-mode flush system 100, in accordance with first embodiments of the present disclosure.

Referring to FIG. 2, the example representation 200 shows the flushing mechanism (202, 204). In some embodiments, the flushing mechanism includes a bypass valve 202 and a built-in toilet water trap 204.

As shown, the bypass valve 202 is located at the base of the dual-mode flush system 100. The bypass valve 202 is actuated when the user input is received via the foot pedal (e.g., 108), for example, to activate the black tank mode or the non-bypass flush mode. When the foot pedal 108 is depressed, it actuates a mechanical linkage or an electronic sensor that opens the bypass valve 202 to allow waste and water to flow into the black tank. This is particularly useful when no external sewer connections are available. It may be appreciated that the bypass valve 202 may be similar to the bypass valve of the co-pending patent application Ser. No.

18/605,043 filed on Mar. 14, 2024. For example, the bypass valve 202 may be configured as a mechanical key. A user may turn or switch the bypass valve 202 to use the black tank or bypass the black tank, as necessary. For example, one exit point for the bypass valve 202 may be the external sewer connection to get rid of waste through a sewer hose, and another exit point for the bypass valve 202 may be the black tank to store the waste until the user may want to evacuate the same. Therefore, the user may turn or switch the mechanical key of the bypass valve 202 in a first position or a second position to dispose the waste as necessary such that if the user turns or switches the mechanical key in the first position, the flush system 100 may operate in the black tank mode, and if the user turns or switches the mechanical key in the second position, the flush system 100 may operate in the residential mode.

In some other embodiments, the bypass valve 202 may be programmed electronically to work in association with a touchscreen. For example, the user may use a user device having a user interface to control the flush system 100 e.g., modes of operation of the flush system 100 by controlling the bypass valve 202. In some embodiments, the user device includes a digital platform communicatively coupled with the bypass valve 202. The digital platform may be a mobile application ("app"). The mobile application may be installed on the user device. In some embodiments, the digital platform may be a web application (e.g., a website or a webpage). In some embodiments, the digital platform may be a desktop application. The digital platform in conjunction with a processing unit may render a graphical user interface on the user device such that the user of the user device may control the bypass valve 202 via the graphical user interface rendered on the user device.

As shown in FIG. 2, the built-in toilet water trap 204 is actuated when the user input is received via the push button (e.g., 110), for example, to activate the residential mode or bypass mode. When the push button 110 is activated, it disables or closes the bypass valve 202 leading to the black tank, redirecting the flow of waste and water to bypass the black tank and flow directly into the external sewer connection. In some embodiments, on activation of the residential mode via the push button 110, the built-in water trap 204 adjusts to accommodate a larger flow of water and waste directly to the sewer connection, ensuring efficient and hygienic disposal.

The water line 206 supplies water to the dual-mode flush system 100 for flushing. The water line 206 is essential for carrying fresh water into the toilet bowl assembly (e.g., 106) when the flushing mechanism (202, 204) is activated, whether for the black tank mode or the residential mode.

In some embodiments, the dual-mode flush system 100 operates on a 12-volt power supply provided by a power supply unit (not shown in FIG. 2). The power supply unit may include a battery pack or may be hard-wired directly into an electrical system of the recreational vehicle. In some other embodiments, the power supply unit may combine a battery pack with solar panels installed on the recreational vehicle such that the dual-mode flush system 100 may switch between the solar panels during the day and the battery pack when solar energy is insufficient. The power supply unit may power any component of the dual-mode flush system 100 such as, but not limited to, the flushing mechanism (202, 204), sensors, automated valves, or the like, associated with the operation of the dual-mode flush system 100.

Figure 3:
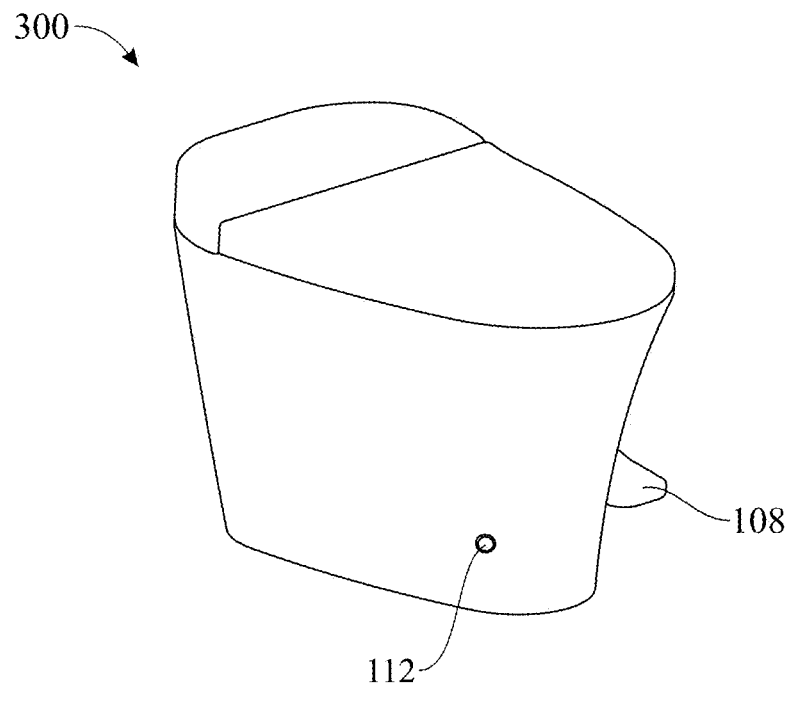
FIG. 3 shows an example representation of a side view of the flush system equipped with a foot sensor, in accordance with embodiments of the present disclosure.

FIG. 3 shows an example representation 300 of a side view of the flush system 100 equipped with a foot sensor 112, in accordance with embodiments of the present disclosure.

Referring to FIG. 3, the example representation 300 shows the flush system 100 (e.g., both the dual-mode flush system and the bypassing system) equipped with the foot sensor 112. In some embodiments, the plurality of user activation interfaces of the flush system 100 include the foot sensor 112 to activate the residential mode of flush operation. As discussed herein, the residential mode is used when the recreational vehicle is connected to the external sewer connection, allowing for direct discharge of waste into the sewer, bypassing the black tank.

It may be appreciated that the flush system 100 is designed for scenarios where the recreational vehicle has access to a stationary sewer connection, making it ideal for long-term stays at a campsite or a park with facilities.

In some embodiments, the foot sensor 112 may use pressure or proximity technology to detect a user's foot without the need for physical contact, to actuate the residential mode. The foot sensor 112 may be used in scenarios where hands-free operation is desirable, for example, for convenience or to maintain cleanliness. In some embodiments, the foot sensor 112 may use infrared sensors or ultrasonic sensors to detect the presence of a foot within a specific distance from the sensor. It may be appreciated that users may be able to adjust the sensitivity of the foot sensor 112 in different environmental conditions or to accommodate personal preferences for sensor activation distance or pressure.

In some embodiments, the foot sensor 112 may incorporate a light source, e.g., Light Emitting Diode (LED), that illuminate to indicate an active state of the foot sensor 112 or to guide the user to the optimal spot for foot placement. In some embodiments, a manual override option may be available, for example, a push button 110 that can be activated in case the foot sensor 112 fails or in situations where electronic control is not feasible. This may help in ensuring reliability and continuous functionality.

It may be appreciated that the flush system 100 may enable users to program the foot sensor 112 to control other functions or settings such as, but not limited to, lifting the seat and lid assembly 102 or activating a pre-rinse, through different gestures or duration of presence.

Figure 4:
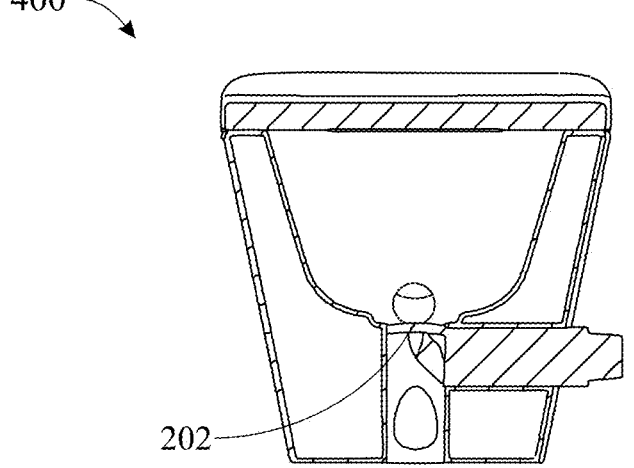
FIG. 4 shows an example representation of a cross-sectional view of the dual-mode flush system using a bypass valve, in accordance with a first embodiment of the present disclosure.

FIG. 4 shows an example representation 400 of a cross-sectional view of the dual-mode flush system 100 using a bypass valve 202, in accordance with first embodiments of the present disclosure.

Referring to FIG. 4, the example representation 400 shows the bypass valve 202. When operating in the black tank mode or the non-bypass mode, the flushing mechanism, e.g., the bypass valve 202 is actuated. The bypass valve 202 controls the release of waste from the toilet bowl assembly (e.g., 106) into the black tank. In some embodiments, the bypass valve 202 is actuated by the foot pedal (e.g., 108 of FIG. 1 or FIG. 3). When the foot pedal 108 is pressed, it triggers the bypass valve 202 to open, allowing waste and water to flow from the toilet bowl assembly 106 into the black tank. In some embodiments, when the bypass valve 202 is actuated by the foot pedal 108, water flows into the toilet bowl assembly 106, assisting in the transport of waste into the black tank.

When the push button 110 or the foot sensor 112 is pressed, it triggers the bypass valve 202 to close, bypassing the black tank, and allowing the waste and water to flow from the toilet bowl assembly 106 into a sewer outlet.

It may be appreciated that the configuration discussed in FIG. 4 is important for situations where users are in locations without direct sewer hookups, allowing for sanitary waste storage until a disposal facility can be accessed.

Figure 5:
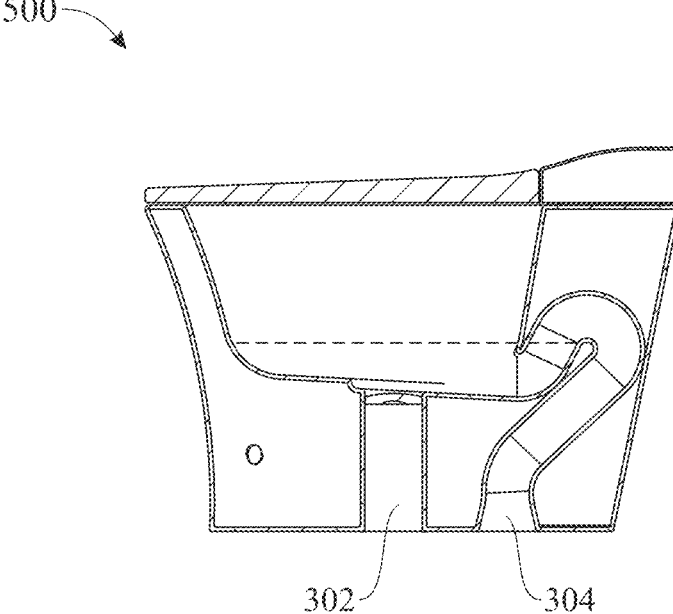
FIG. 5 shows an example representation of a sectional view of a bypassing system using below floor bypass discharge, in accordance with a second embodiment of the present disclosure.

FIG. 5 shows an example representation 500 of a sectional view of the bypassing system 100 using below floor bypass discharge, in accordance with second embodiments of the present disclosure.

Referring to FIG. 5, the example representation 500 includes a first floor flange 302 and a second floor flange 304. Each of the first floor flange 302 and the second floor flange 304 corresponds to different flushing mechanisms.

The first floor flange 302 is designed to connect the toilet bowl assembly 106 to the black tank, used in the black tank mode. The first floor flange 302 connected to the black tank is used when the recreational vehicle is not connected to the external sewer connection. The first floor flange 302 serves as a primary path for waste when the black tank mode is activated. When the black tank mode is activated, via one of the plurality of user activation interfaces, for example, via the foot pedal 108, the waste is directed through the first floor flange 302 into the black tank, ensuring a secure and leak-proof connection.

The second floor flange 304 is designed to provide a direct route for waste from the toilet bowl assembly 106 to a sewer outlet, used in the residential mode. The second floor flange 304 allows for the waste to bypass the black tank entirely, flowing directly from the toilet bowl assembly 106 to the sewer outlet. Activating the residential mode opens the route to the second floor flange 304, bypassing the black tank. In some embodiments, one or more valves may be equipped, for example, automated valves to ensure that the correct route is opened or closed depending on the mode of flush operation.

It may be appreciated that the first floor flange 302 and the second floor flange 304 may be easily removeable or replaceable as part of the bypassing system 100, allowing for quick upgrades or replacements.

Figure 6:
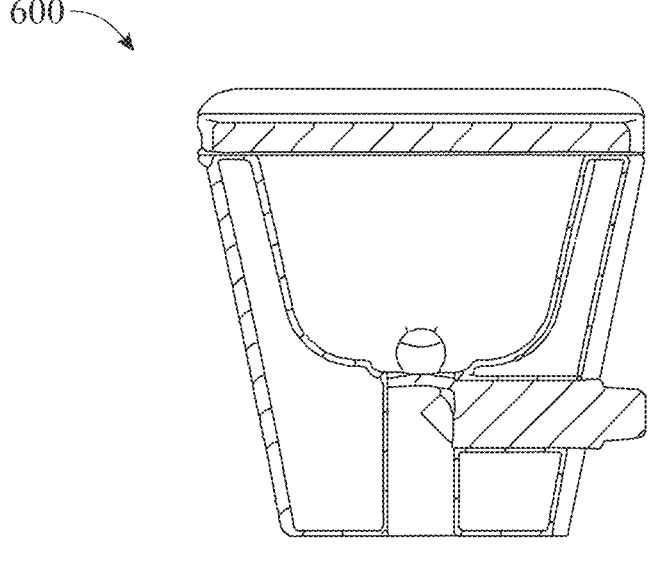
FIG. 6 shows an example representation of a cross-sectional view of the bypassing system using floor flange, in accordance with the second embodiment of the present disclosure.

FIG. 6 shows an example representation 600 of a cross-sectional view of the bypassing system 100 using floor flanges, in accordance with second embodiments of the present disclosure.

Referring to FIG. 6, the example representation 600 shows that the bypassing system 100, in some embodiments, may use the first floor flange 302 and the second floor flange 304 to dispose of the waste in respective modes of flush operation. For example, the first floor flange 302 may be used in the non-bypass mode or the black tank mode, and the second floor flange 304 may be used in the bypass mode or the residential mode.

Figure 7:
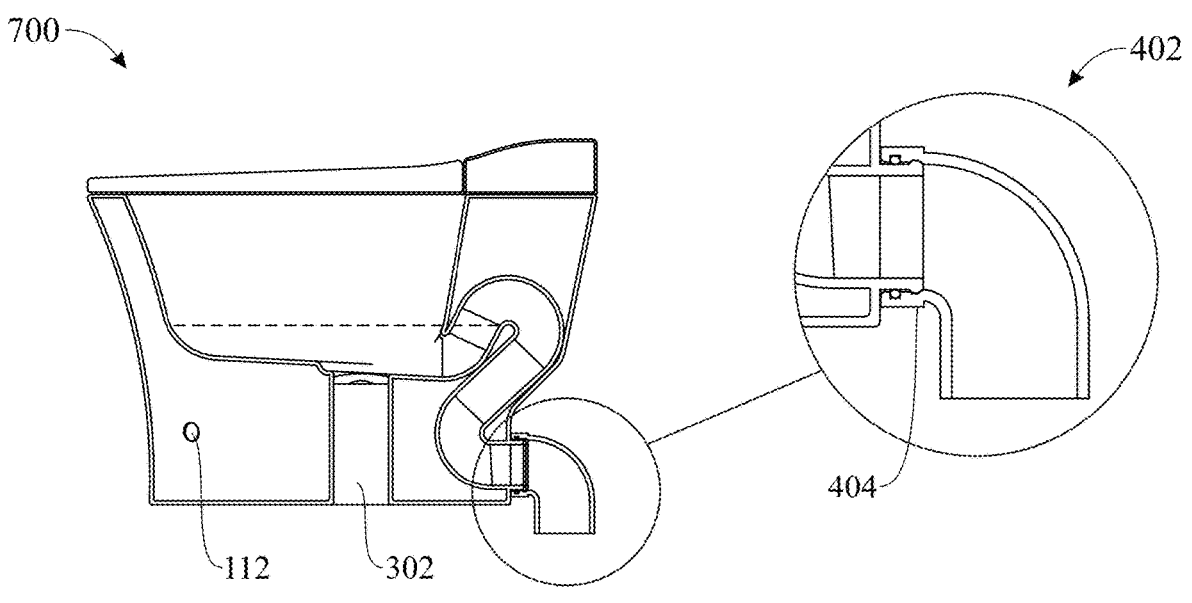
FIG. 7 shows an example representation of components of a bypassing system using above floor bypass discharge, in accordance with a third embodiment of the present disclosure.

FIG. 7 shows an example representation 700 of components of the bypassing system 100 using above floor bypass discharge, in accordance with third embodiments of the present disclosure.

Referring to FIG. 7, the example representation 700 includes a discharge unit 402. In some embodiments, the flushing mechanism includes the discharge unit 402. The discharge unit 402 includes a rotating elbow fitting 404. In the residential mode, the discharge unit 402 directs the waste directly to a sewer outlet. The rotating elbow fitting 404 is designed to rotate, allowing for adjustable positioning to align with sewer connection points. The rotating elbow fitting 404 allows for the discharge unit 402 to be adjusted to align precisely with the sewer outlet, irrespective of the positioning of the recreational vehicle relative to the sewer connection point. The flexibility provided by the rotating elbow fitting 404 is essential in RV settings where the alignment of the vehicle and infrastructure may vary significantly.

In some embodiments, the rotating elbow fitting 404 rotates up to 360 degrees. The rotating elbow fitting 404 may include a locking mechanism to secure it in any chosen position, preventing movement during travel or operation. The locking mechanism of the rotating elbow fitting 404 includes a snap fit coupled with an O-ring seal, ensuring a secure and leak-proof connection to the sewer line. The O-ring seal may be made from durable materials resistant to wear and chemical degradation, enhancing the longevity and reliability of the connection.

Figure 8:
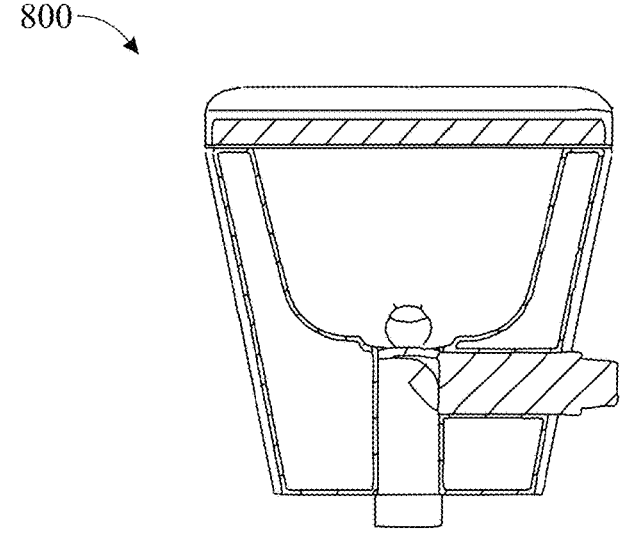
FIG. 8 shows an example representation of a cross-sectional view of the bypassing system using above floor bypass discharge, in accordance with the third embodiment of the present disclosure.

FIG. 8 shows an example representation 800 of a cross-sectional view of the bypassing system 100 using above floor bypass discharge, in accordance with third embodiments of the present disclosure.

Referring to FIG. 8, the example representation 800 shows that the bypassing system 100, in some embodiments, may use the first floor flange 302 and the discharge unit 402 to dispose the waste in respective modes of flush operation. For example, the first floor flange 302 may be used in the black tank mode, and the discharge unit 402 may be used in the residential mode.

Therefore, in accordance with embodiments of the present disclosure, based on user input, i.e., via the foot pedal 108, the push button 110, the foot sensor 112, or the like, the flush system 100 (e.g., the dual-mode flush system and the bypassing system) may be configured to switch between modes of flush operations to either bypass the black tank or dispose the waste at the black tank. Accordingly, the system and methods of the present disclosure provide a sanitary, convenient, and environmentally beneficial system for disposing of waste from a recreational vehicle.

It may be noted that the flush system 100, as discussed herein, helps in saving water to a great extent. For example, conventional systems and methods use around 75 to 80 gallons of water to flush back the black tank on a weekly basis. Further, in conventional systems and methods, a sewer connection connects the black tank to a sewer hose to dispose off the waste, which is a least desirable way to get rid of the waste. Therefore, the present disclosure facilitates directly flushing out the waste to the sewer hose, without having to connect the black tank to the sewer hose.

In some embodiments, the method or methods described above may be executed or carried out by a computing system including a tangible computer-readable storage medium, also described herein as a storage machine, that holds machine-readable instructions executable by a logic machine (e.g., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an API.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A flush system in a recreational vehicle, comprising:
a toilet bowl assembly to receive waste;
a flushing mechanism operatively connected to the toilet bowl assembly; and
a plurality of user activation interfaces coupled to the flushing mechanism, configured to activate a mode of operation of the flush system, wherein the mode of operation comprises one of: a black tank mode and a residential mode,
wherein the flushing mechanism comprises a control module configured to automatically select the mode of operation further based on availability of an external sewer connection, and wherein the flush system comprises one or more sensors to detect the availability of the external sewer connection.

2. The flush system of claim 1, wherein in the black tank mode, the flushing mechanism is configured to direct the waste to an integrated black tank of the recreational vehicle when an external sewer connection is unavailable.

3. The flush system of claim 2, wherein in the residential mode, the flushing mechanism is configured to direct the waste directly to the external sewer connection, bypassing the integrated black tank.

4. The flush system of claim 1, wherein the plurality of user activation interfaces comprises a foot pedal to activate the black tank mode, and at least one of: a push button or a foot sensor to activate the residential mode.

5. The flush system of claim 1, further comprising a power supply unit configured to provide electrical power to the flush system.

6. The flush system of claim 1, wherein the flushing mechanism comprises a bypass valve, wherein in the black tank mode, a user input received via one of the plurality of user activation interfaces triggers the bypass valve to open to allow the waste to flow into a black tank, and wherein in the residential mode, the user input received via another one of the plurality of user activation interfaces triggers the bypass valve to close to allow the waste to flow into an external sewer connection.

7. The flush system of claim 1, wherein the flushing mechanism comprises a first floor flange and a second floor flange for use in the black tank mode and the residential mode, respectively.

8. The flush system of claim 1, wherein the flushing mechanism comprises a first floor flange and a discharge unit to direct the waste based on the mode of operation.

9. The flush system of claim 8, wherein the discharge unit comprises a rotating elbow fitting configured to direct the waste directly to an external sewer connection, bypassing a black tank in the residential mode.

10. A method of managing waste in a recreational vehicle, comprising:

receiving a user input via a plurality of user activation interfaces of a flush system;

determining a mode of operation of the flush system based on the received user input, wherein the mode of operation comprises one of: a black tank mode, or a residential mode, wherein determining the mode of operation further comprises:

detecting, via one or more sensors, an availability of an external sewer connection;

determining the mode of operation as the black tank mode when the external sewer connection is unavailable; and determining the mode of operation as the residential mode when the external sewer connection is available;

activating a flushing mechanism corresponding to the determined mode of operation; and operating the flush system to transport waste from a toilet bowl assembly through the activated flushing mechanism.

11. The method of claim 10, wherein in the black tank mode, the method comprises directing the waste, through the flushing mechanism, to an integrated black tank of the recreational vehicle.

12. The method of claim 10, wherein in the residential mode, the method comprises directing the waste, through the flushing mechanism, to an external sewer connection, bypassing the integrated black tank.

13. The method of claim 10, wherein the plurality of user activation interfaces comprises a foot pedal, and at least one of: a push button or a foot sensor.

14. The method of claim 13, wherein when receiving the user input via the foot pedal, the method comprises determining the mode of operation as the black tank mode and directing the waste to an integrated black tank of the recreational vehicle through the flushing mechanism.

15. The method of claim 13, wherein when receiving the user input via at least one of the push buttons or the foot sensor, the method comprises determining the mode of operation as the residential mode and directing the waste to an external sewer connection through the flushing mechanism.

16. The method of claim 10, wherein the flushing mechanism comprises a bypass valve, wherein in the black tank mode, the method comprises triggering the bypass valve to open, when receiving the user input via one of the plurality of user activation interfaces, to allow the waste to flow into a black tank, and wherein in the residential mode, the method comprises triggering the bypass valve to close, when receiving the user input via another one of the plurality of user activation interfaces, to allow the waste to flow into an external sewer connection.

17. The method of claim 10, wherein the flushing mechanism comprises a first floor flange and a second floor flange, and wherein activating the flushing mechanism comprises activating the first floor flange in the black tank mode and the second floor flange in the residential mode.

18. The method of claim 10, wherein the flushing mechanism comprises a first floor flange and a discharge unit to transport the waste based on the mode of operation.

* * * * *